United States Patent
Agrawal et al.

(10) Patent No.: US 12,455,598 B2
(45) Date of Patent: Oct. 28, 2025

(54) METHOD AND APPARATUS FOR SCREEN CAPTURE AND RECORD ON SCROLLABLE/ROLLABLE DEVICES

(71) Applicant: MOTOROLA MOBILITY LLC, Wilmington, DE (US)

(72) Inventors: Amit Kumar Agrawal, Bangalore (IN); Xiaofeng Zhu, Nanjing (CN); Sanjay Dhar, Algonquin, IL (US)

(73) Assignee: Motorola Mobility LLC, Chicago, IL (US)

( * ) Notice: Subject to any disclaimer, the term of this patent is extended or adjusted under 35 U.S.C. 154(b) by 46 days.

(21) Appl. No.: 18/536,947

(22) Filed: Dec. 12, 2023

(65) Prior Publication Data
US 2025/0117044 A1   Apr. 10, 2025

Related U.S. Application Data

(63) Continuation of application No. PCT/CN2023/123335, filed on Oct. 8, 2023.

(51) Int. Cl.
*G06F 1/16* (2006.01)
*G06F 3/01* (2006.01)
(Continued)

(52) U.S. Cl.
CPC ............ *G06F 1/1652* (2013.01); *G06F 3/011* (2013.01); *G06V 40/10* (2022.01); *G09G 3/035* (2020.08);
(Continued)

(58) Field of Classification Search
CPC ....... G06F 1/1652; G06F 3/011; G06V 40/10; G09G 3/035; G09G 2340/045; G09G 2354/00

See application file for complete search history.

(56) References Cited

U.S. PATENT DOCUMENTS

| | | | |
|---|---|---|---|
| 2006/0238494 A1* | 10/2006 | Narayanaswami | G06F 3/002 345/156 |
| 2019/0261519 A1* | 8/2019 | Park | H05K 1/118 |
| 2023/0267617 A1* | 8/2023 | Kim | G06F 1/1624 382/173 |

FOREIGN PATENT DOCUMENTS

| | | |
|---|---|---|
| CN | 108735100 A | 11/2018 |
| CN | 111727423 A | 9/2020 |

(Continued)

OTHER PUBLICATIONS

International Search Report and Written Opinion, Patent Cooperation Treaty, International Application No. PCT/CN2023/123335, Dec. 21, 2023.

*Primary Examiner* — Cory A Almeida
(74) *Attorney, Agent, or Firm* — Isidore PLLC

(57) ABSTRACT

An electronic device, method, and computer program product enable screen capture and playback of an extendable display provided by a flexible display coupled across a front side of a flexible display support structure that moves relative to a first housing. A remaining portion of the flexible display either scrolls up or rolls onto a backside of the base housing. A controller of the electronic device determines dimensions of a front display based on data from a position sensor. The controller presents visual content on the flexible display. In response to a trigger to screen record the visual content, the controller records in media file(s) frame(s) of the front display along with position data of the flexible display support structure. For playback, the controller activates the translation mechanism to match the position data and presents the frame(s) on corresponding portions of the flexible display from which the frame(s) was captured.

20 Claims, 9 Drawing Sheets

(51) Int. Cl.
*G06V 40/10* (2022.01)
*G09G 3/00* (2006.01)

(52) U.S. Cl.
CPC ... *G09G 2340/045* (2013.01); *G09G 2354/00* (2013.01)

(56) References Cited

FOREIGN PATENT DOCUMENTS

| | | |
|---|---|---|
| CN | 213043713 U | 4/2021 |
| CN | 113703644 A | 11/2021 |
| CN | 116584089 A | 8/2023 |

* cited by examiner

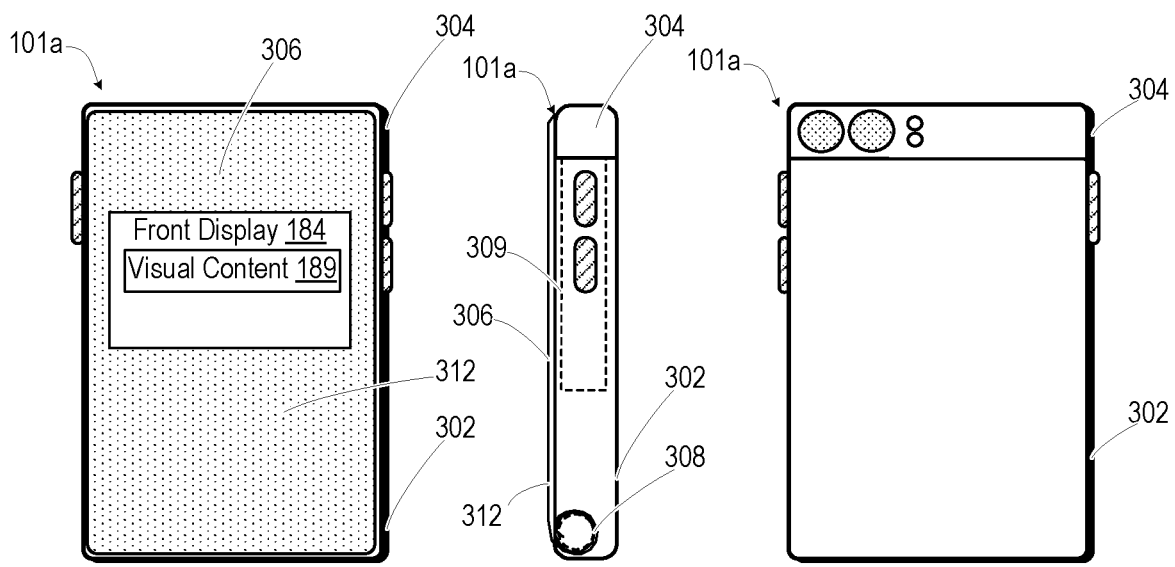
FIG. 3A  FIG. 3B  FIG. 3C
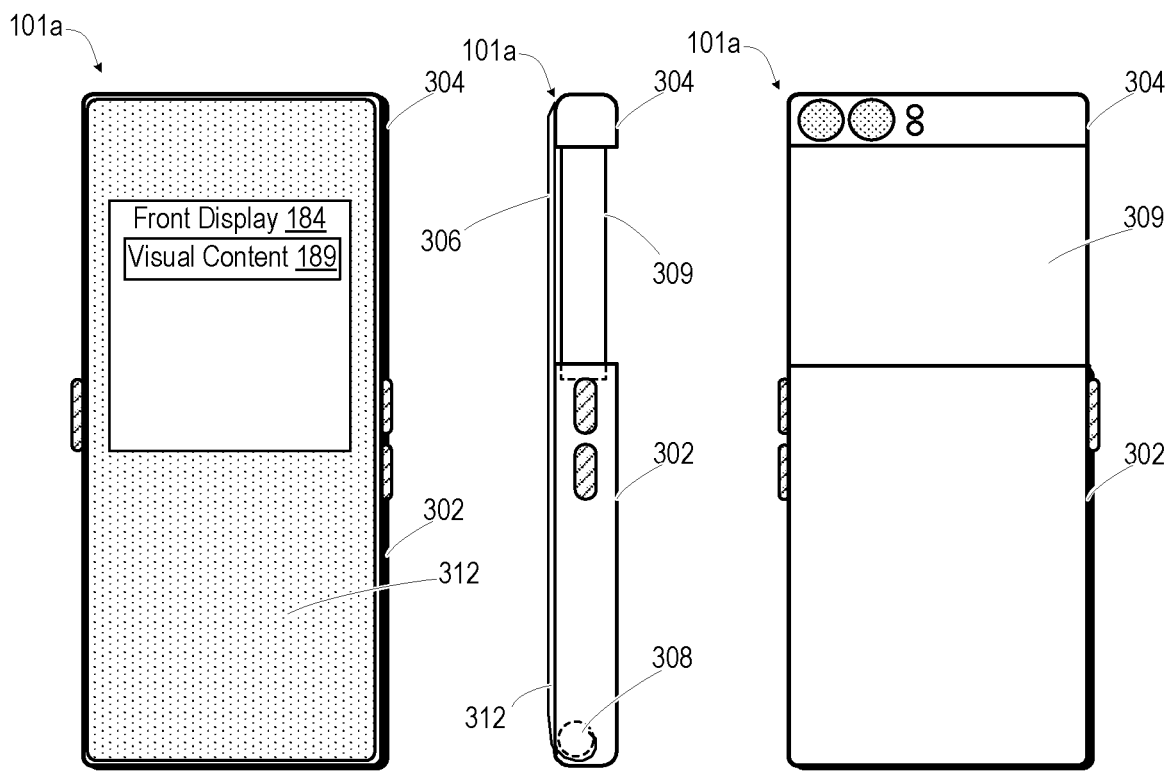
FIG. 3D  FIG. 3E  FIG. 3F

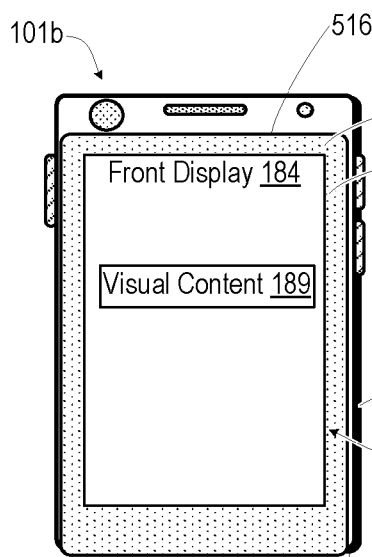
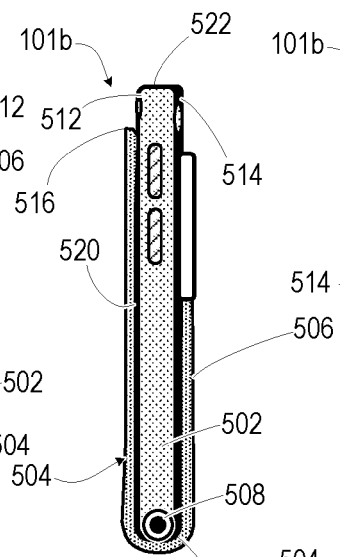
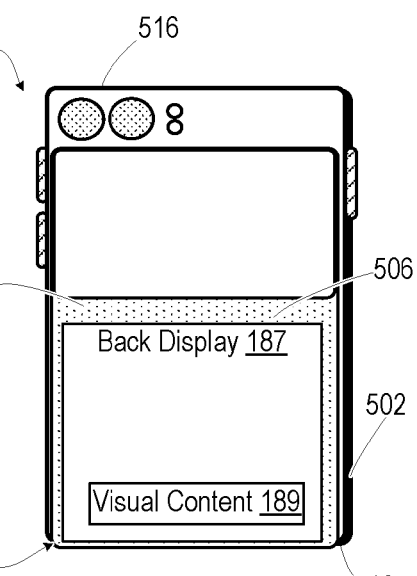
FIG. 5A  FIG. 5B  FIG. 5C
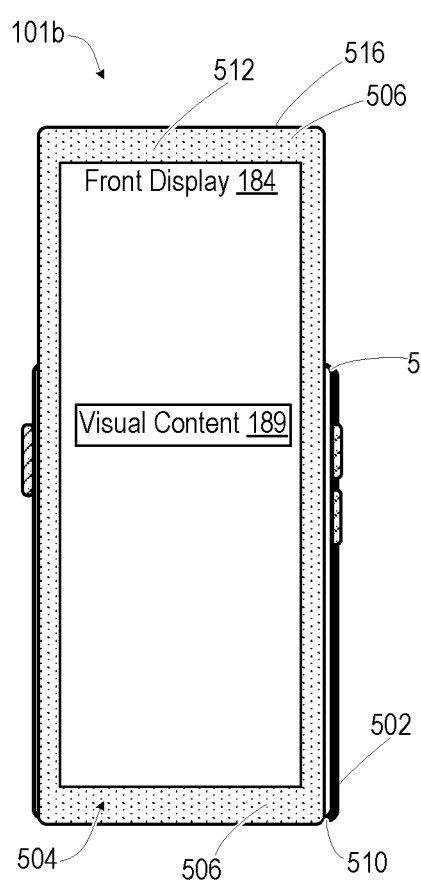
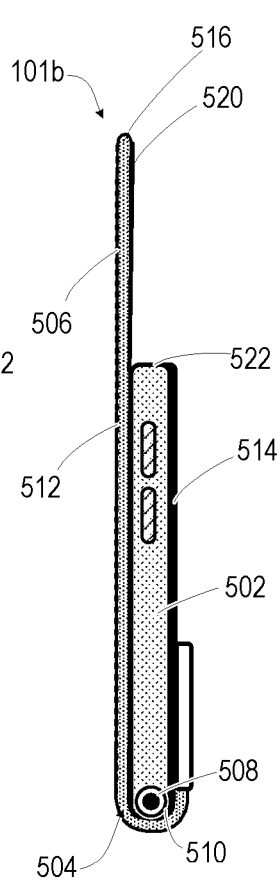
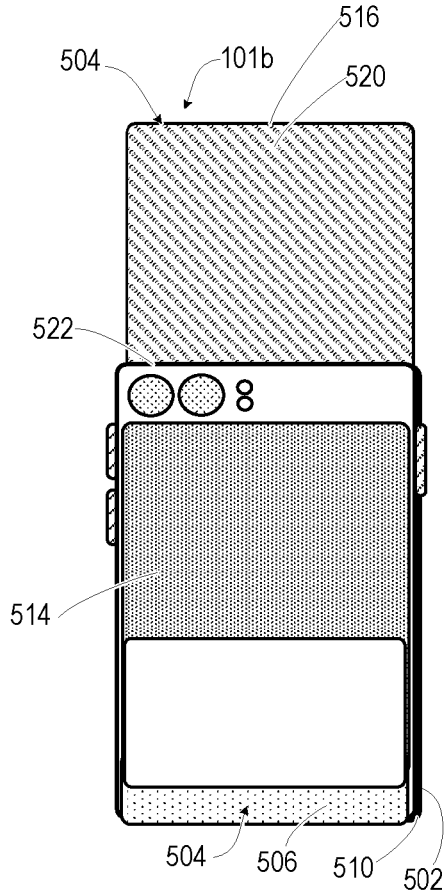
FIG. 5D  FIG. 5E  FIG. 5F

METHOD AND APPARATUS FOR SCREEN CAPTURE AND RECORD ON SCROLLABLE/ROLLABLE DEVICES

PRIORITY APPLICATION

This application claims priority to International Application No. PCT/CN2023/123335, filed Oct. 8, 2023, the content of which is incorporated herein.

BACKGROUND

1. Technical Field

The present disclosure relates generally to electronic devices with a graphical display, and more particularly to electronic devices with an extendable graphical display.

2. Description of the Related Art

Portable electronic communication devices, particularly smartphones, have become ubiquitous. People all over the world use such devices to stay connected. These devices have been designed in various mechanical configurations. Conventionally, these communication devices each have a rigid display disposed along a major face of the communication device. One recent configuration of handheld portable electronic devices incorporates scrollable flexible displays that position a front portion on a front side of the device housing and remaining portion scrolls up within the device housing. Another recent configuration of handheld portable electronic devices incorporates blade assembly that retracts and extends a front portion of the flexible display on a front side of a device housing and a remaining portion of the flexible display rolls onto the back side of the device housing. An additional recent configuration of handheld portable electronic devices incorporates a telescoping housing that extends and retracts relative to a base housing with a front portion of a flexible display on a front side of the device and remaining portion rolled onto the back side of the device housing. The available size of a front display changes for each of these configurations. The latter two may present a back display while in the retracted position as either an alternative to the front display or for being concurrently used.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3A is a front view of a second example communication device having a flexible display support structure implemented as a telescoping housing that is in a retracted position supporting a flexible display having a main front portion and a remaining portion that scrolls, according to one or more embodiments;

FIG. 3B is a left side view of the second example communication device of FIG. 3A having the telescoping housing in the retracted position, according to one or more embodiments;

FIG. 3C is a back view of the second example communication device of FIG. 3A having the telescoping housing in the retracted position, according to one or more embodiments;

FIG. 3D is a front view of the second example communication device of FIG. 3A with the telescoping housing in an extended position, according to one or more embodiments;

FIG. 3E is a left side view of the second example communication device of FIG. 3A having the telescoping housing in the extended position, according to one or more embodiments;

FIG. 3F is a back view of the second example communication device of FIG. 3A having the telescoping housing in the extended position, according to one or more embodiments;

FIG. 5A is a front view of a first example communication device having a flexible display support structure implemented as a blade assembly that is in a retracted position, according to one or more embodiments;

FIG. 5B is a left side view of the first example communication device of FIG. 5A having the blade assembly in the retracted position, according to one or more embodiments;

FIG. 5C is a back view of the first example communication device of FIG. 5A having the blade assembly in the retracted position, according to one or more embodiments;

FIG. 5D is a front view of the first example communication device of FIG. 5A with the blade assembly in an extended position, according to one or more embodiments;

FIG. 5E is a left side view of the first example communication device of FIG. 5A having the blade assembly in the extended position, according to one or more embodiments;

FIG. 5F is a back view of the first example communication device of FIG. 5A having the blade assembly in the extended position, according to one or more embodiments;

DETAILED DESCRIPTION

Figure 1:
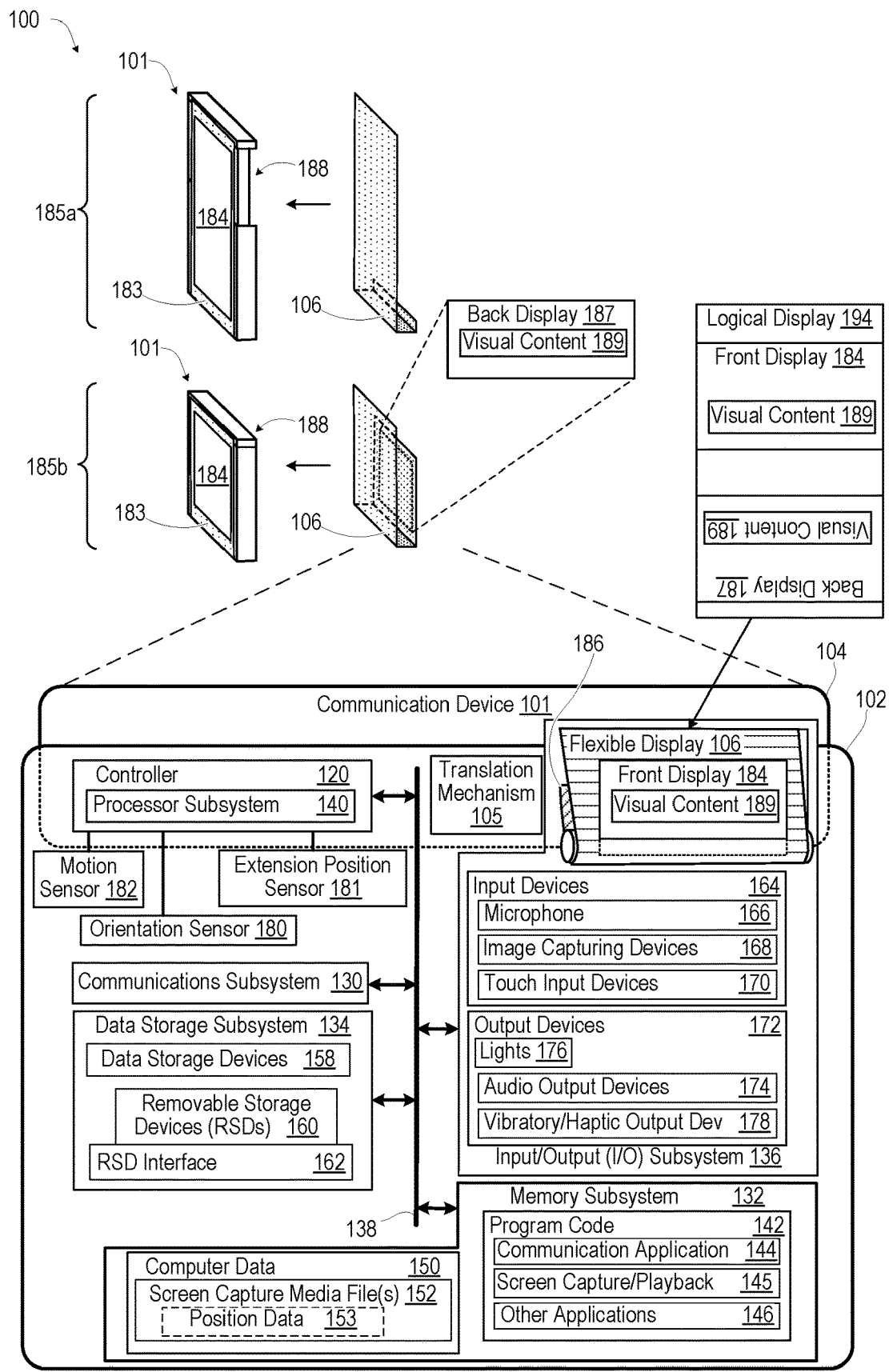
FIG. 1 presents a simplified functional block diagram along with three-dimensional views of a communication device having screen capture functionality for visual content presented on an extendable display, according to one or more embodiments.

According to aspects of the present disclosure, an electronic device, a method, and a computer program product enable screen capture and playback of an extendable display of the electronic device. Screen capture functionality may address capturing visual content presented by the extendable display when the extendable display is at a retracted position, at an intermediate position, or an extended position. Screen capture functionality may address capturing visual content presented by the extendable display while the extendable displace is extending or is retracting. Screen capture functionality may address capturing visual content presented by the extendable display having a flexible display rolled onto both the front and the back of the electronic device. The flexible display may present visual content on a front portion of the flexible display, on a back portion of the flexible display, or concurrently on both the front and back portions of the flexible display. In one or more embodiments, the electronic device includes a first housing having a front side and a back side. The electronic device includes a flexible display support structure moveably attached to and positionable on the first housing to move a distal edge of the support structure between a retracted position and an extended position relative to the first housing. The electronic device includes a flexible display coupled to the flexible display support structure across a front side of the first housing. While the flexible display support structure is in the extended position, a larger portion of the flexible display is presented as a front display on the front side. While the flexible display support structure is in the retracted position, a smaller portion of the flexible display is presented as the front display on the front side, with a remaining portion being one of: (i) scrolled up inside of the first housing; and (ii) rolled back providing a back display on the back side of the first housing. The electronic device includes a translation mechanism operable to position the flexible display support structure between the retracted position and the extended position. The electronic device includes a position sensor configured to detect a position of the flexible display support structure relative to the first housing. A controller is communicatively coupled to the flexible display, the translation mechanism, and the position sensor. The controller determines dimensions of the front display based on the position sensor. The controller presents visual content on the flexible display. In response to a trigger to screen record the visual content, the controller records in one or more media files at least one frame of the front display along with position data of the flexible display support structure.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of an electronic device having an extendable design form, in which the features of the present disclosure are advantageously implemented for supporting screen capture and playback of an extendable display. In one or more embodiments, the electronic device includes additional communications functionality as communication device 101 to operate as a mobile user device in communication environment 100. Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices.

Communication device 101 includes base housing 102 having a front side and a back side. Flexible display support structure 104 is moveably attached to and positionable on base housing 102 between a retracted position and an extended position relative to base housing 102. In one or more embodiments, translation mechanism 105 moves flexible display support structure 104 relative to base housing 102. Flexible display 106 is coupled across at least a front face of base housing 102 and flexible display support structure 104. Communication device 101 presents a larger portion of flexible display 106 while flexible display support structure 104 is in the extended position and presents a smaller portion of flexible display 106 while flexible display support structure 104 is in the retracted position.

In addition to controller 120, communication device 101 may include communications subsystem 130, memory subsystem 132, data storage subsystem 134 and input/output (I/O) subsystem 136. To enable management by controller 120, system interlink 138 communicatively connects controller 120 with communications subsystem 130, memory subsystem 132, data storage subsystem 134 and I/O subsystem 136. System interlink 138 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections, including one or more intermediate electrical components. Although certain direct interconnections (i.e., system interlink 138) are illustrated in FIG. 1, it is to be understood that more, fewer, or different interconnections may be present in other embodiments.

Controller 120 includes processor subsystem 140, which includes one or more central processing units (CPUs) or data processors. Processor subsystem 140 can include one or more digital signal processors that can be integrated with data processor(s). Processor subsystem 140 can include other processors such as auxiliary processor(s) that may act as a low power consumption, always-on sensor hub for physical sensors. Controller 120 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 132 stores program code 142 for execution by processor subsystem 140 to provide the functionality described herein. Program code 142 includes applications such as communication application 144 that generates or facilitates incoming or outgoing calls and data/text transmissions. Program code 142 may include screen capture/replay application 145 and other applications 146. These applications may be software or firmware that, when executed by controller 120, configures communication device 101 to provide functionality described herein. In one or more embodiments, several of the described aspects of the present disclosure are provided via executable program code of applications executed by controller 120. In one or more embodiments, program code 142 may be integrated into a distinct chipset or hardware module as firmware that operates separately from executable program code. Portions of program code 142 may be incorporated into different hardware components that operate in a distributed or collaborative manner. Memory subsystem 132 further includes operating system (OS), firmware interface, such as basic input/output system (BIOS) or Uniform Extensible Firmware Interface (UEFI), and firmware, which also includes and may thus be considered as program code 142.

Program code 142 may access, use, generate, modify, store, or communicate computer data 150, such as screen capture media files 152 that may include position data 153. Computer data 150 may incorporate "data" that originated as raw, real-world "analog" information that consists of basic facts and figures. Computer data 150 includes different forms of data, such as numerical data, images, coding, notes, and financial data. Computer data 150 may originate at communication device 101 or be retrieved from a remote device via communications subsystem 130. Communication device 101 may store, modify, present, or transmit computer data 150 such as media files 152 and position data 153 that is specific to the flexible display support structure 104. Computer data 150 may be organized in one of a number of different data structures. Common examples of computer data 150 include video, graphics, text, and images. Computer data 150 can also be in other forms of flat files, databases, and other data structures.

Data storage subsystem 132 of communication device 101 includes data storage device(s) 158. Controller 120 is communicatively connected, via system interlink 138, to data storage device(s) 158. Data storage subsystem 134 provides program code 142 and computer data 150 stored on nonvolatile storage that is accessible by controller 120. For example, data storage subsystem 134 can provide a selection of program code 142 and computer data 150. These applications can be loaded into memory subsystem 132 for execution/processing by controller 120. In one or more embodiments, data storage device(s) 158 can include hard disk drives (HDDs), optical disk drives, and/or solid-state drives (SSDs), etc. Data storage subsystem 134 of communication device 101 can include removable storage device(s) (RSD(s)) 160, which is received in RSD interface 162. Controller 120 is communicatively connected to RSD 160, via system interlink 138 and RSD interface 162. In one or more embodiments, RSD 160 is a non-transitory computer program product or computer readable storage device that may be executed by a processor associated with a user device such as communication device 101. Controller 120 can access data storage device(s) 158 or RSD 160 to provision communication device 101 with program code 142 and computer data 150.

I/O subsystem 136 may include input devices 164 such as microphone 166, image capturing devices 168, and touch input devices 170 (e.g., screens, keys or buttons). I/O subsystem 136 may include output devices 172 such as flexible display 106, audio output devices 174, lights 176, and vibratory or haptic output devices 178.

In one or more embodiments, controller 120, via communications subsystem 130, performs multiple types of cellular over-the-air (OTA) or wireless communication, such as by using a Bluetooth connection or other personal access network (PAN) connection. In an example, a user may wear a health monitoring device such as a smartwatch that is communicatively coupled via a wireless connection. In one or more embodiments, communications subsystem 130 includes a global positioning system (GPS) module that receives GPS broadcasts from GPS satellites to obtain geospatial location information. In one or more embodiments, controller 120, via communications subsystem 130, communicates via a wireless local area network (WLAN) link using one or more IEEE 802.11 WLAN protocols with an access point. In one or more embodiments, controller 120, via communications subsystem 130, may communicate via an OTA cellular connection with radio access networks (RANs). In an example, communication device 101, via communications subsystem 130, connects via RANs of a terrestrial network that is communicatively connected to a network server.

Controller 120 may be directly communicatively coupled, or indirectly communicatively coupled via system interlink 138 or a support processor, to one or more physical sensors. In an example, physical sensors may include orientation sensor 180 configured to detect in which direction is up. Physical sensors may include extension position sensor 181 configured to detect a specific retracted, intermediate, or extended position of flexible display support structure 104 between fully retracted and fully extended positions. Physical sensors may include motion sensor 182 configured to detect accelerations/movement of communication device 101.

Controller 120 may include various functionality that enables controller 120 to perform different aspects of artificial intelligence (AI) modules for computation tasks. AI modules may include an artificial neural network, a decision tree, a support vector machine, Hidden Markov model, linear regression, logistic regression, Bayesian networks, and so forth. The AI modules can be individually trained to perform specific tasks and can be arranged in different sets of AI modules to generate different types of output.

In one or more embodiments, flexible display 106 is coupled to flexible display support structure 104 across front side 183 of first housing 102 to present a larger portion of flexible display 106 as front display 184 on front side 183, while flexible display support structure 104 is in the extended position as depicted to the right of bracket 185a. A smaller portion of flexible display 106 is presented as front display 184 on front side 183, while flexible display support structure 104 is in the retracted position, as depicted to the right of bracket 185b. While flexible display support structure 104 is in the retracted position, remaining portion 186 of flexible display 106 is one of: (i) scrolled up inside of first housing 102 as described below with regard to FIGS. 3A-3F and 4; or (ii) rolled back providing back display 187 on back side 188 of first housing 102. A first example of a "rollable extendable display" is described below with regards to FIGS. 5A-5F. A second example of a "rollable extendable display" is described below with regards to FIGS. 6A-6F. For embodiments that roll the flexible display 106, front display 184 and back display 187 may be individually inactive or may be individually active to present visual content 189. For each implementation of an extendable display, translation mechanism 105 is operable to position flexible display support structure 104 between the retracted position and the extended position. Position sensor 181 is configured to detect a position of flexible display support structure 104 relative to first housing 102. Controller 120 is communicatively coupled to translation mechanism 105, flexible display 106, and position sensor 181 to determine retracted and extended dimensions of front display 184 based on position sensor 181. Controller 120 presents visual content 189 on flexible display 106. In response to a trigger to screen record visual content 189, controller 120 records in one or more screen capture media files 152 in memory subsystem 132 at least one frame of front display 184 along with position data 153 of flexible display support structure 104. In response to a playback trigger for one or more screen capture media files 152, controller 120 activates translation mechanism 105 to match a position of flexible display support structure 104 with position data 153 corresponding to the at least one frame. Controller 120 presents the at least one frame on corresponding portions of flexible display 106 from which the at least one frame was captured.

In one or more embodiments, controller 120 manages dimensions of logical display 194 for placement of visual content 189 in software with one or more areas assigned to be front display 184. Different applications or functions may be given different areas that are adjacent or can be logically stacked in a selectable window hierarchy. Generally, assigned dimensions of the one or more areas are responsive to the position of the flexible display support structure 104. One or more of the areas are resized or omitted to fit within the available front portion of flexible display 106. Generally, all of the available front portion of flexible display 106 is utilized for presenting visual content. Screen capture may include all of the front portion of the flexible display 106, even areas that are assigned to different applications or functions. Alternatively, screen capture may be limited to a particular area assigned to one active application or function, such as a camera image preview that is currently selected while omitting adjacent home screen widgets or icons. For embodiments capable of presenting both front display 184 and back display 187, screen capture functionality may similarly include resizing or omitting back display 187 in relation to dimensions of a back portion of flexible display 106. In one or more embodiments, positioning of flexible display support structure 104 is responsive to an intended size, resolution, or aspect ratio of virtual content 189. In one or more embodiments, positioning of flexible display support structure 104 is responsive for a requirement to concurrently present visual content 189 on both front and back displays 184 and 187. Since the flexible display 106 physically changes orientation by 180 degrees when rolling from front side to back side of the communication device 101, visual content 189 presented in back display 187 is rotated 180 degrees in logical display 194 so that the physical orientation when viewed by a user has the same orientation as front display 184.

For clarity, communication device 101 is depicted as having an extendable display that translates on one side. Aspects of the present disclosure may be implemented in a communication device that extends on both opposite sides. Aspects of the present disclosure may be implemented in a foldable design form such as a vertically flipping orientation or laterally opening book fold provided by two housings coupled along adjacent sides by a pivoting hinge. In an example, a single flexible display may span across both housings and extend on one or both outer edges to each side of the hinge. In another example, each housing may support an individual flexible display that may extend on the outer edge opposite to the hinge or one or both of the edges orthogonal to the hinge.

Figure 2:
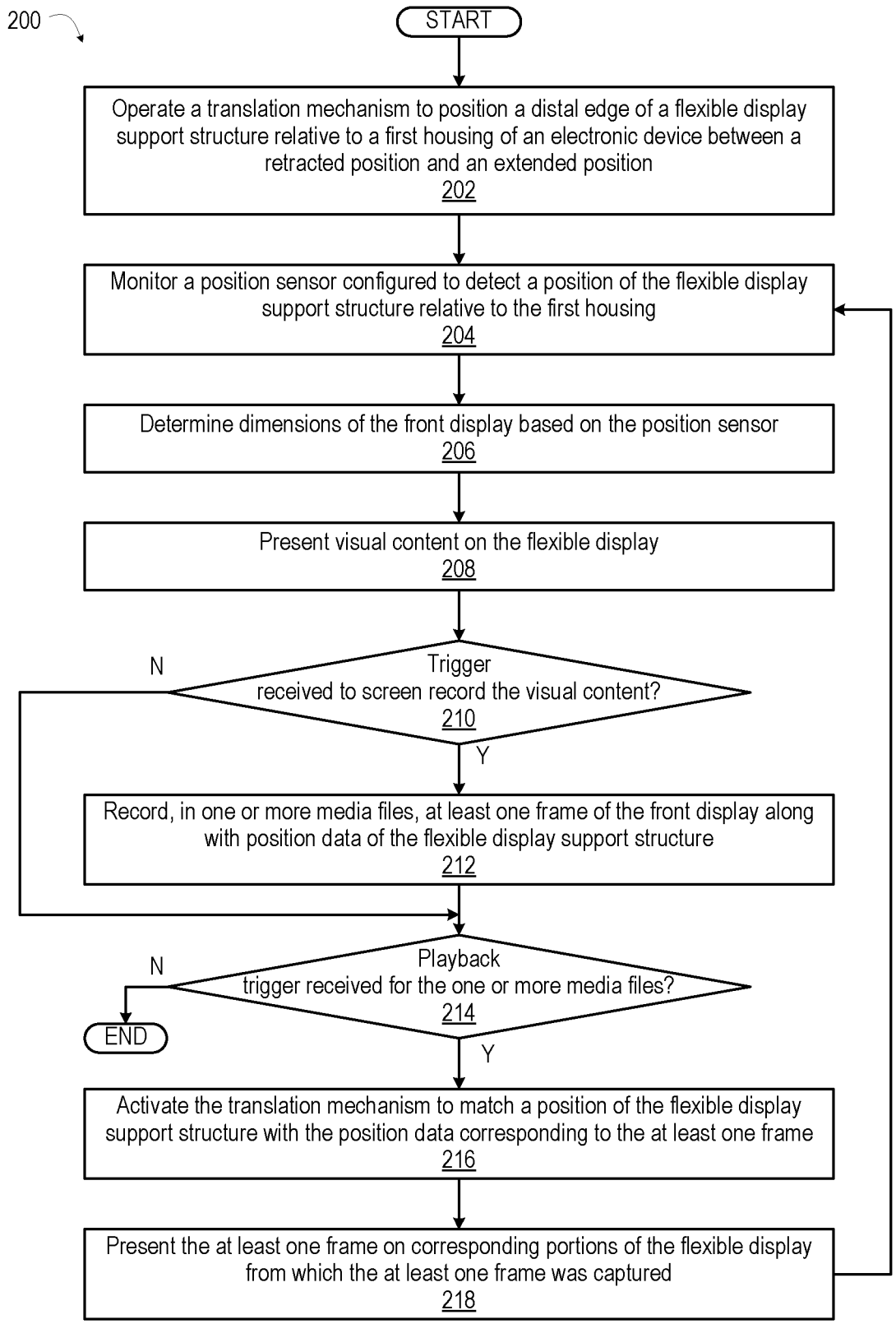
FIG. 2 is a flow diagram presenting a method of capturing and replaying screen capture of visual content presented on a flexible display that may resized between a retracted position and an extended position, according to one or more embodiments.

FIG. 2 is a flow diagram presenting method 200 for capturing and replaying screen capture of visual content presented on a flexible display that may be resized between a retracted position and an extended position. The description of method 200 is provided with general reference to the specific components illustrated within the preceding FIG. 1. Specific components referenced in method 200 may be identical or similar to components of the same name used in describing preceding FIG. 1. In one or more embodiments, controller 120 (FIG. 1) configures communication device 101 (FIG. 1) or a similar computing device to provide the described functionality of method 200.

With reference to FIG. 2, method 200 includes operating a translation mechanism to position a distal edge of a flexible display support structure relative to a first housing of an electronic device between a retracted position and an extended position (block 202). The translation mechanism can position the flexible display support structure at any one of multiple positions between a fully retracted position, at least one intermediate position, and a fully extended position. The actual number of intermediate positions is a design feature and can be different for each device and can also be programmable, e.g., by a device user. The first housing has a front side and a back side. A flexible display is coupled to the flexible display support structure across a front side of the first housing to present a larger portion of the flexible display as a front display on the front side, while the flexible display support structure is in the extended position. While the flexible display support structure is in the retracted position, the flexible display presents a smaller portion as the front display on the front side with a remaining portion being one of: (i) scrolled up inside of the first housing; and (ii) rolled back providing a back display on the back side of the first housing. Method 200 includes monitoring a position sensor configured to detect a position of the flexible display support structure relative to the first housing (block 204). Positioning monitoring may continue in background or be actively monitored during translation of the flexible display support structure. Method 200 includes determining dimensions of the front display based on the position sensor data (block 206). Method 200 includes presenting visual content on the flexible display, in part based on the position sensor data (block 208). Method 200 includes determining whether a trigger is received to screen record the visual content (decision block 210). In response to a trigger to screen record the visual content, method 200 includes recording, in one or more media files, at least one frame of the front display along with position data of the flexible display support structure (block 212). In one or more embodiments, the position data is stored as a part of a metatag or header associated with the one or more media files.

In response to determining that a trigger is not received to screen record the visual content in decision block 210 or after block 212, method 200 includes determining whether a playback trigger is received for the one or more stored media files (decision block 214). In response to determining that a playback trigger is not received for the one or more media files, method 200 returns to block 204. In response to determining that a playback trigger is received for the one or more media files, method 200 includes activating the translation mechanism to match a position of the flexible display support structure with the position data corresponding to the at least one frame (block 216). The one or more media files may have been captured by the same device or may have been received from a different device. Method 200 includes presenting the at least one frame on corresponding portions of the flexible display from which the at least one frame was captured (block 218). Then method 200 returns to block 204.

FIG. 3A is a front view of second example communication device 101a having base housing 302 coupled to flexible display support structure 104 (FIG. 1) that is implemented as telescoping housing 304, which is in a retracted position. Flexible display 306 extends across front side 312 of base housing 302 and telescoping housing 304. FIG. 3B is a left side view of second example communication device 101a having telescoping housing 304 in the retracted position relative to base housing 302. A remaining portion of flexible display 306 scrolls up on scrolling mechanism 308 when telescoping housing 304 is in the retracted position. FIG. 3C is a back view of second example communication device 101a having telescoping housing 304 in the retracted position. FIG. 3D is a front view of second example communication device 101a with telescoping housing 304 in an extended position. FIG. 3E is a left side view of second example communication device 101a having telescoping housing 304 in the extended position, which unscrolls an additional portion of flexible display 306 from scrolling mechanism 308 to cover extension portion 309 of telescoping housing 304. FIG. 3F is a back view of second example communication device 101a having the telescoping housing in the extended position. Translation mechanism 105 (FIG. 1) may be implemented as an electric motor that operates by extending and retracting telescoping housing 304 relative to base housing 302. Scrolling mechanism may be spring loaded to reel in a remaining portion of flexible display 306 during retraction and to release the remaining portion of flexible display 306 during extension.

Figure 4:
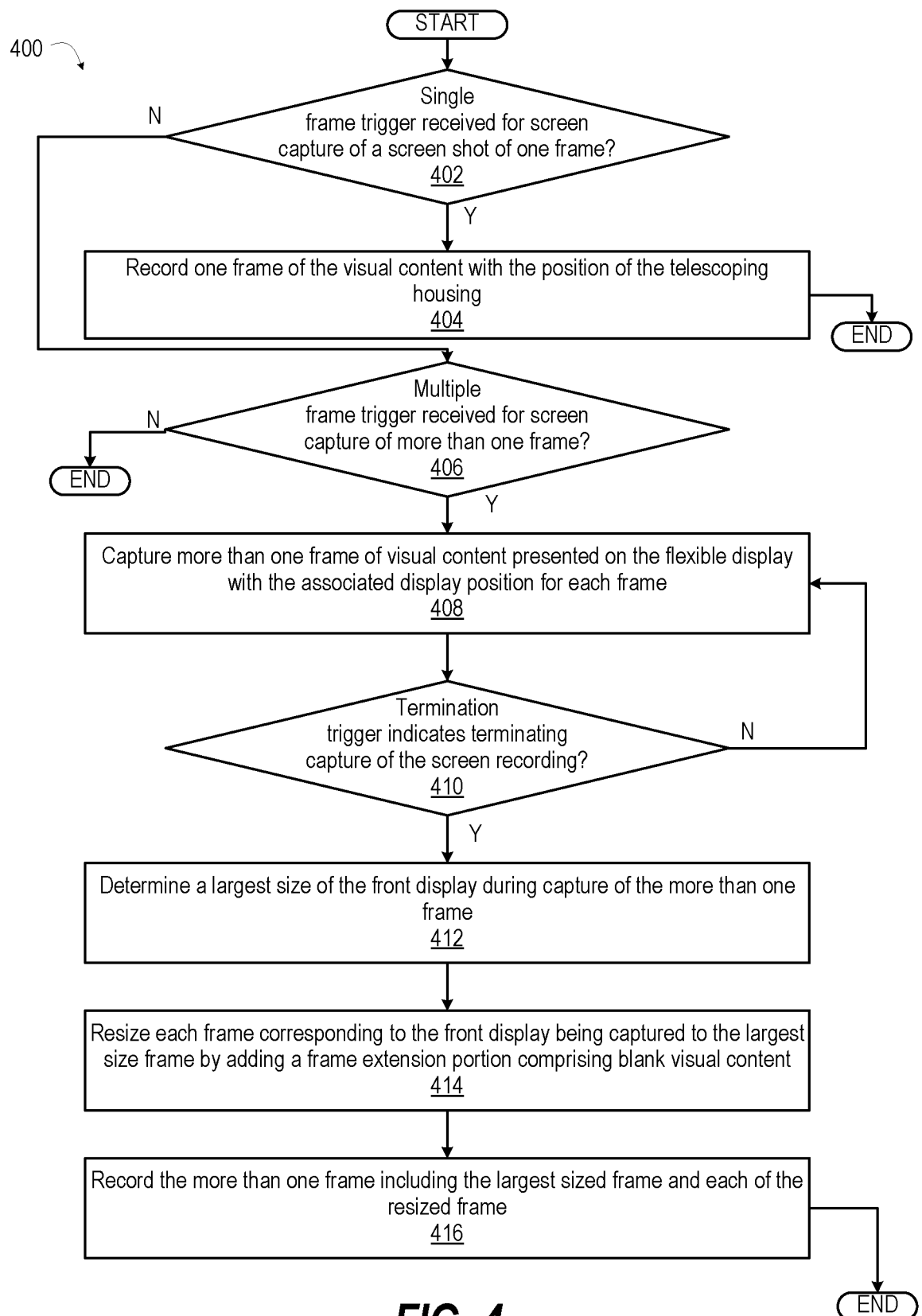
FIG. 4 is a flow diagram presenting a method of screen capture of the flexible display implemented as a scrolling display, according to one or more embodiments.

FIG. 4 is a flow diagram presenting a method 400 of screen capture of the flexible display implemented as a scrolling display. Method 400 may augment method 200 (FIG. 2). The description of method 400 is provided with general reference to the specific components illustrated within the preceding FIGS. 1 and 3A-3F. Specific components referenced in method 400 (FIG. 4) may be identical or similar to components of the same name used in describing preceding FIGS. 1 and 3A-3F. In one or more embodiments, controller 120 (FIG. 1) configures communication device 101 (FIG. 1), communication device 101a (FIG. 3A), or a similar computing device to provide the described functionality of method 400 (FIG. 4). The electronic device such as communication device 101 (FIG. 1), communication device 101a (FIG. 3A) includes a scrolling mechanism that receives the remaining portion of the flexible display while the flexible display support structure is in the retracted position. The flexible display support structure is a telescoping housing having an extension portion slidingly received into a first housing edge of the first housing.

With reference to FIG. 4, method 400 includes determining whether a single frame trigger is received for screen capture of a screen shot of one frame (decision block 402). In response to determining that the trigger indicates the screen shot of one frame, method 400 includes recording one frame of the visual content with the position data of the telescoping housing (block 404). Method 400 includes not recording blank data corresponding to the remaining portion of the flexible display scrolled up by the scrolling mechanism and not presented on the front side of telescoping housing and first housing. Then method 400 ends.

In response to determining that the trigger does not indicate the screen shot of one frame in decision block 402, method 400 includes determining whether a multiple frame trigger is received for screen capture of more than one frame (decision block 406). In response to determining that multiple frame trigger is not received for screen capture of more than one frame, method 400 ends. In response to determining that multiple frame trigger is received for screen capture of more than one frame, method 400 includes capturing more than one frame of visual content presented on the flexible display with the associated display position for each frame (block 408). Method 400 includes determining whether a termination trigger indicates terminating capture of the screen recording of the more than one frame with corresponding more than one position data (decision block 410). In response to determining that the termination trigger does not indicate terminating capture, method 400 returns to block 408. In response to determining that the termination trigger indicates terminating capture, method 400 includes determining a largest size of the front display during capture of the more than one frame (block 412). Method 400 includes resizing each frame corresponding to the front display being captured to the largest size frame by adding a frame extension portion comprising blank visual content (block 414). Method 400 includes recording the more than one frame including the largest sized frame and each of the resized frames (block 416). Then method 400 ends.

FIG. 5A is a front view of first example communication device 101b having base housing 502 and having flexible display support structure 104 (FIG. 1) implemented as blade assembly 504 that positions flexible display 506 in a retracted position relative to base housing 502. FIG. 5B is a left side view of first example communication device 101b having blade assembly 504 in the retracted position. Display roller 508 is positioned at and aligned with first housing edge 510, which is at the bottom, as depicted, of base housing 502 between front side 512 and back side 514 and opposite to distal edge 516 of blade assembly 504. FIG. 5C is a back view of first example communication device 101b having blade assembly 504 in the retracted position. With particular reference to FIGS. 5B-5C, a larger portion of flexible display 506 is rolled onto back side 514 of communication device 101b.

FIG. 5D is a front view of first example communication device 101b with blade assembly 504 in an extended position. FIG. 5E is a left side view of first example communication device 101b having blade assembly 504 in the extended position. FIG. 5F is a back view of first example communication device 101b having blade assembly 504 in the extended position. With particular reference to FIGS. 5E-5F, blade assembly 504 includes blade substrate 520 that is slidably coupled to base housing 502. Flexible display 506 is attached to blade substrate 520. Blade substrate 520 has a rigid portion positionable between a retracted position aligned with front side 512 of base housing 502 (FIGS. 5A-5C) and an extended position extending beyond second housing edge 522 opposite to first housing edge 510. Blade substrate 520 includes a flexible portion that contacts display roller 508 between the retracted position and the extended position to move a portion of blade assembly 504 between front side 512 and back side 514. Translation mechanism 105 (FIG. 1) may be implemented as an electric motor that operates by rotating display roller 508 (FIGS. 5B and 5E) that is engaged to blade substrate 520 to slide blade assembly 504 relative to base housing 502 between a fully retracted position and a fully extended position. Alternatively, translation mechanism 105 (FIG. 1) may be implemented as an electric motor that operates by sliding blade assembly 504 that is guided by display roller 508 that is passively positioned.

The size of front display 184 of FIGS. 5A and 5D are in relation to available size of flexible display 506 on front side 512 of communication device 101b the retracted and extended position of the blade assembly 504, respectively smaller and larger. With reference to FIG. 5C, the presence and size of is related to the available size of a back portion of flexible display 106 in the retracted position. In FIG. 5F, the omission of a display on back side 514 is related to the insufficient size of flexible display 506 in the extended position.

Figures 6A, 6B, 6C:
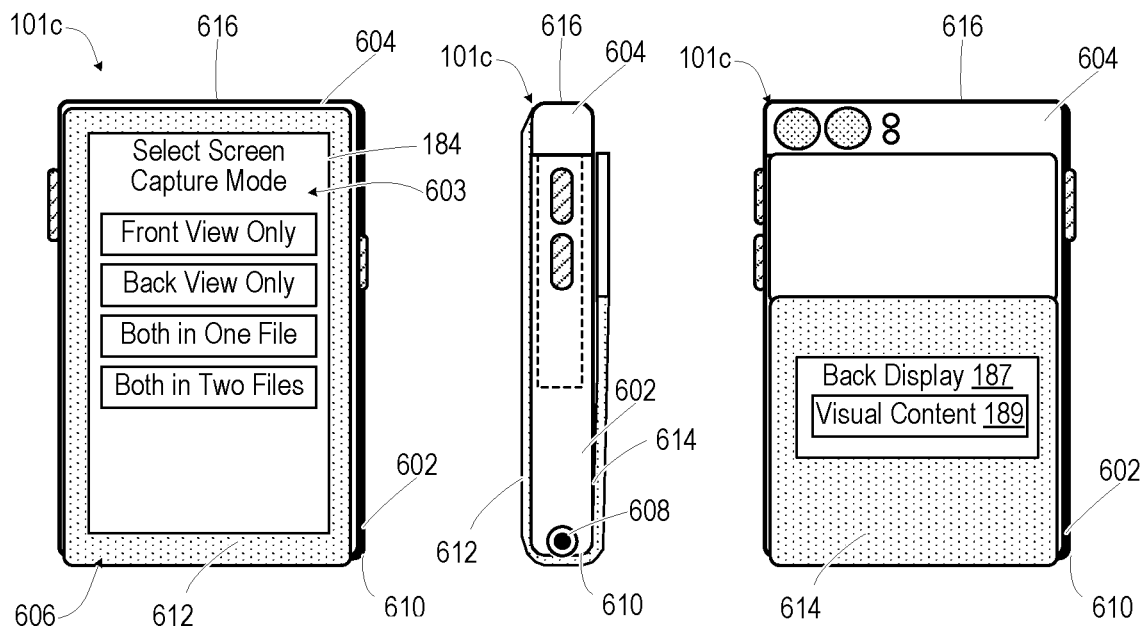
FIG. 6A is a front view of a third example communication device having a flexible display support structure implemented as a telescoping housing that is in a retracted position supporting a flexible display having a remaining portion that rolls onto a back of a base housing, according to one or more embodiments.
FIG. 6B is a left side view of the third example communication device of FIG. 6A having the telescoping housing in the retracted position, according to one or more embodiments.
FIG. 6C is a back view of the third example communication device of FIG. 6A having the telescoping housing in the retracted position, according to one or more embodiments.
Figures 6D, 6E, 6F:
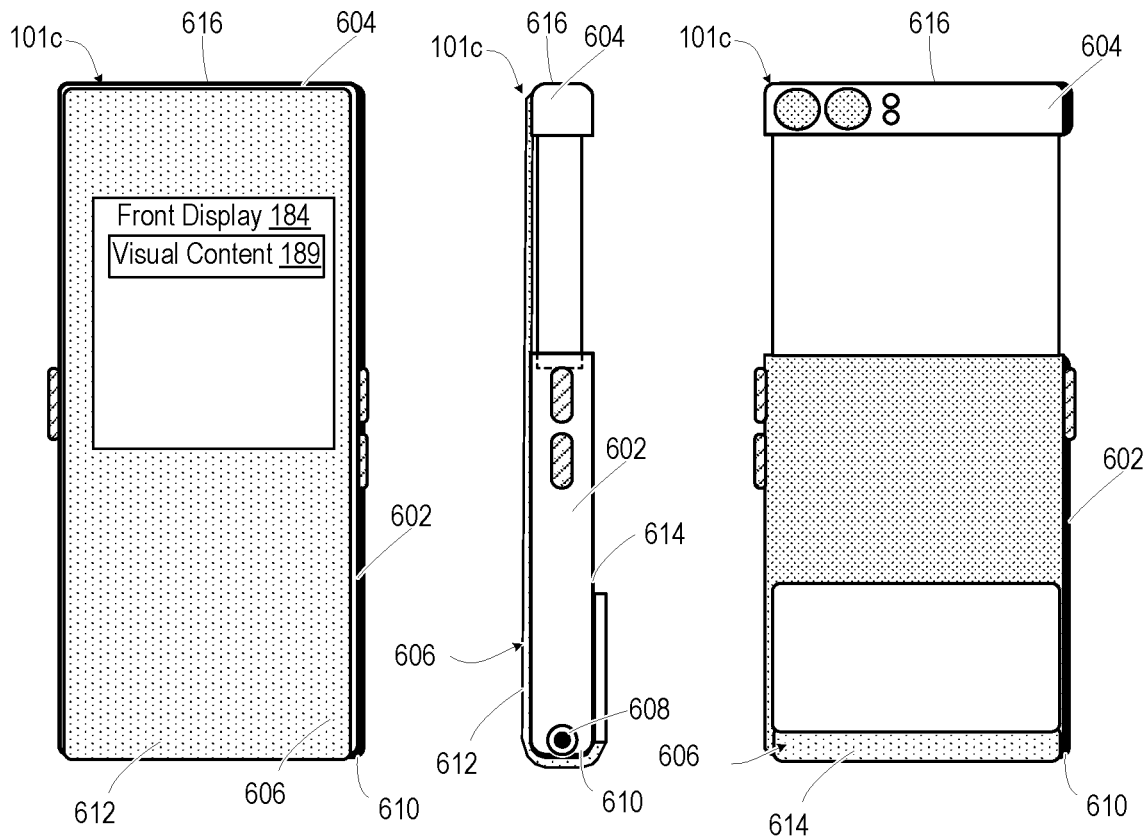
FIG. 6D is a front view of the third example communication device of FIG. 6A with the telescoping housing in an extended position, according to one or more embodiments.
FIG. 6E is a left side view of the third example communication device of FIG. 6A having the telescoping housing in the extended position, according to one or more embodiments.
FIG. 6F is a back view of the third example communication device of FIG. 6A having the telescoping housing in the extended position, according to one or more embodiments.

FIG. 6A is a front view of third example communication device 101c having base housing 602 coupled to flexible display support structure 104 (FIG. 1) that is implemented as telescoping housing 604, which is in a retracted position. Flexible display 606 extends across front side 612 of base housing 602 and telescoping housing 604. In an example, pop-up user interface 603 is presented on front display 184 for selecting capture mode from among: (i) front view only; (ii) back view only; (iii) both views in two or more files; or (iv) both views in a single merged file. FIG. 6B is a left side view of third example communication device 101c having telescoping housing 604 in the retracted position. Display roller 608 is positioned at and aligned with first housing edge 610, which is at the bottom, as depicted, of base housing 602 between front side 612 and back side 614 and opposite to distal edge 616 of telescoping housing 604. Flexible display 606 contacts display roller 608 between the retracted position and the extended position to move a portion of flexible display 606 between front side 612 and back side 614. FIG. 6C is a back view of third example communication device 101c having telescoping housing 604 in the retracted position. FIG. 6D is a front view of third example communication device 101c with telescoping housing 604 in an extended position. FIG. 6E is a left side view of third example communication device 101c having telescoping housing 604 in the extended position. FIG. 6F is a back view of third example communication device 101c having the telescoping housing in the extended position. Translation mechanism 105 (FIG. 1) may be implemented as an electric motor that operates by rotating display roller 608 (FIGS. 6B and 6E) that is engaged to flexible display 606 to translate flexible display 606 relative to base housing 602 between a fully retracted position and a fully extended position. Alternatively, translation mechanism 105 (FIG. 1) may be implemented as an electric motor that operates by moving flexible display 606 that is guided by display roller 608, which is passively positioned.

Figure 7:
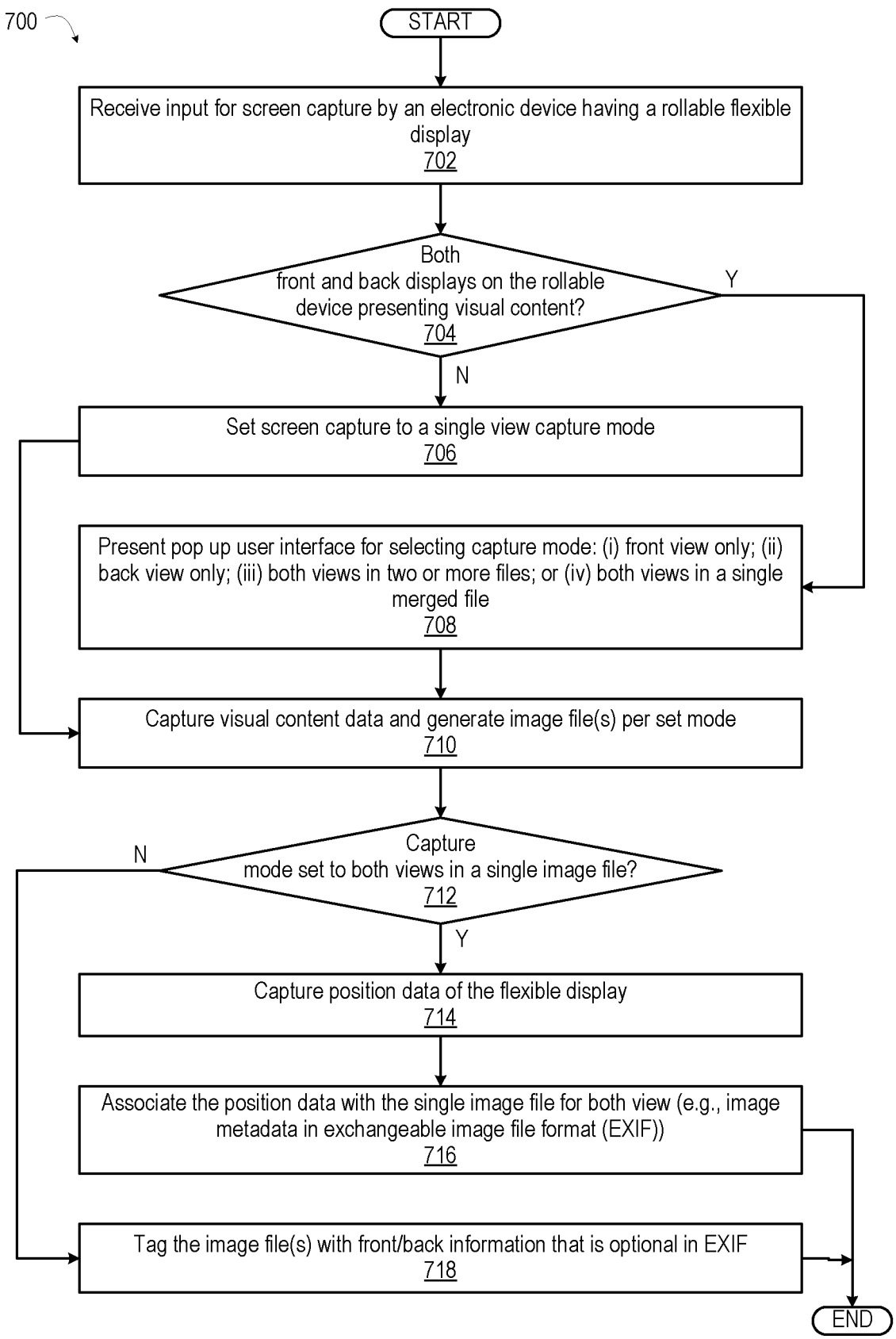
FIG. 7 is a flow diagram presenting a method of screen shot capture and recording on an electronic device having a flexible display that is positioned on both front and back sides of the device, according to one or more embodiments.
Figure 8A:
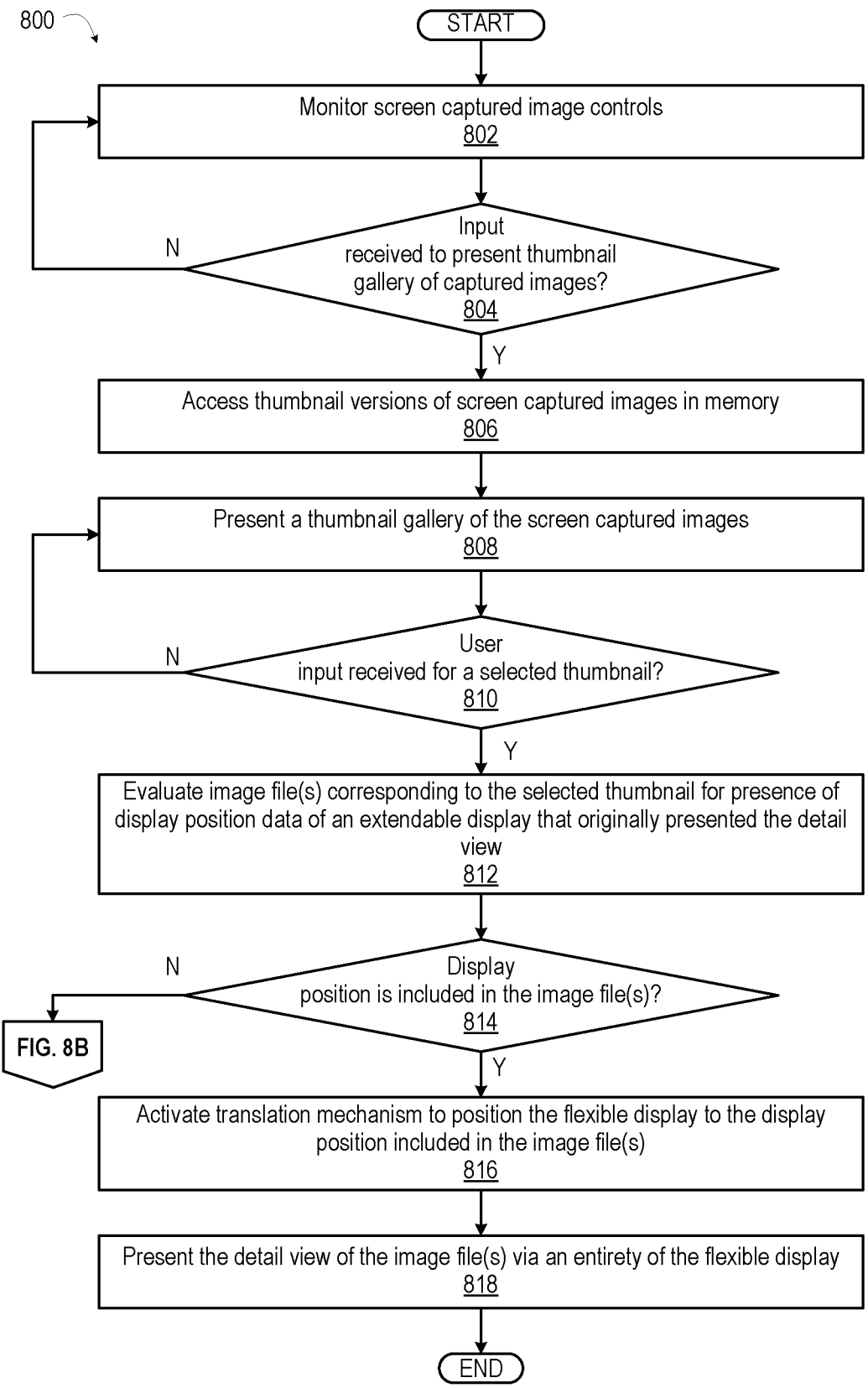
FIGS. 8A-8B (collectively "FIG. 8") are a flow diagram presenting a method of playback of a screen shot captured and recorded on an electronic device having a flexible display that is positioned on both front and back sides of the device, according to one or more embodiments.
Figure 8B:
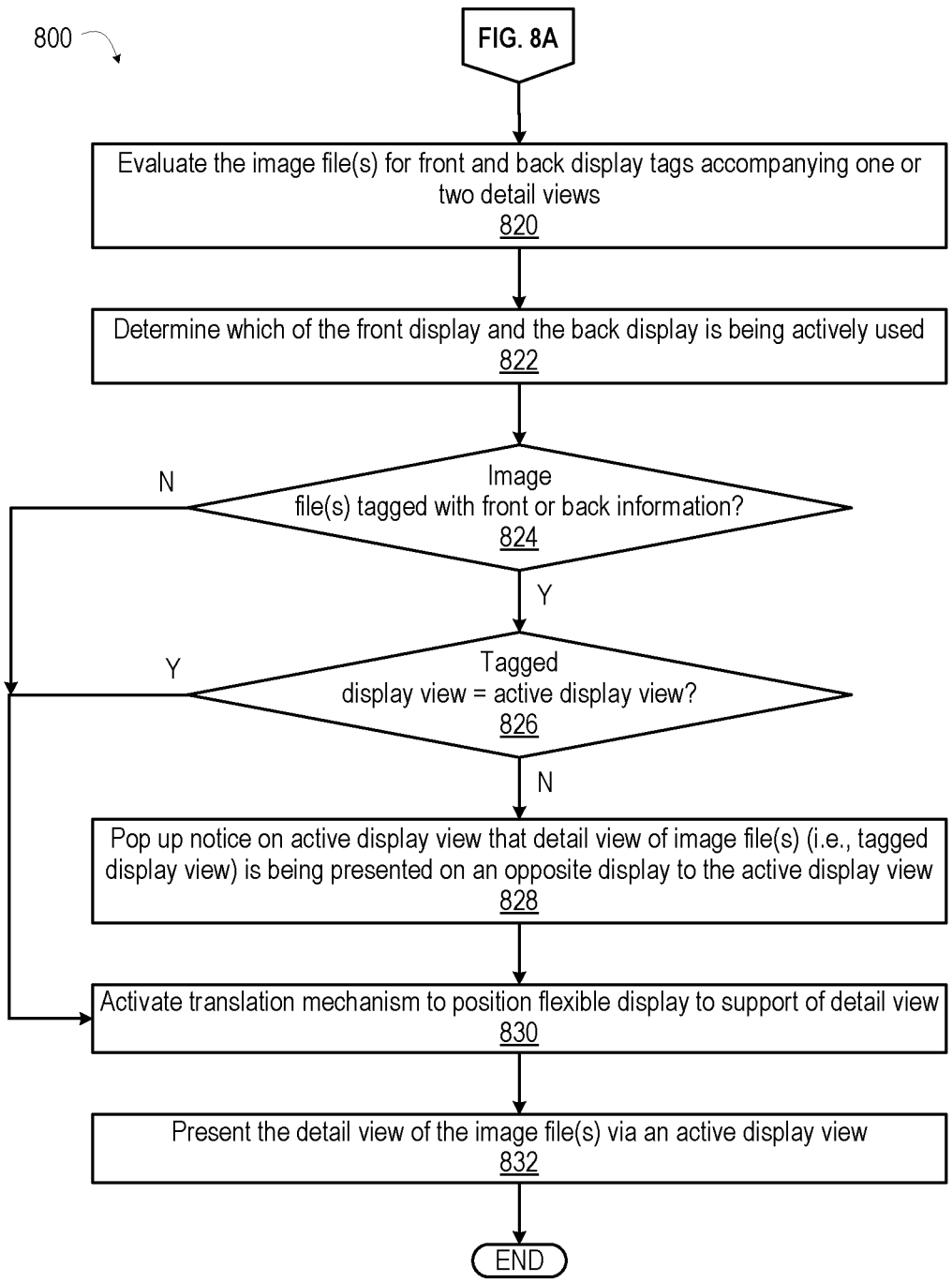

FIG. 7 is a flow diagram presenting method 700 of screen shot capture and recording on an electronic device having a flexible display that is moveable and can be positioned on both front and back sides of the device. FIGS. 8A-8B (collectively "FIG. 8") are a flow diagram presenting method 800 for playback of a screen shot captured and recorded on an electronic device having a flexible display that is positioned on both front and back sides. The descriptions of method 700 (FIG. 7) and method 800 (FIG. 8) are provided with general reference to the specific components illustrated within the preceding FIGS. 1, 2, 3A-3F, 4, 5A-5F, and 6A-6F. Specific components referenced in method 700 (FIG. 7) and method 800 (FIG. 8) may be identical or similar to components of the same name used in describing preceding FIGS. 1, 2, 3A-3F, 4, 5A-5F, and 6A-6F. In one or more embodiments, controller 120 (FIG. 1) configures communication device 101 (FIG. 1), communication device 101a (FIG. 3A), communication device 101b (FIG. 5A), and communication device 101c (FIG. 6A), or a similar computing device to provide the described functionality of method 700 (FIG. 7) and method 800 (FIG. 8).

With reference to FIG. 7, in one or more embodiments, method 700 includes receiving input for screen capture by an electronic device having a rollable flexible display (block 702). Method 700 includes determining whether both front and back displays on the rollable device are presenting visual content (decision block 704). In response to determining that both front and back displays on the rollable device are not presenting visual content, method 700 includes setting screen capture to a single view capture mode (block 706). In response to determining that both front and back displays on the rollable device are presenting visual content, method 700 may include presenting pop-up user interface for selecting capture mode from among: (i) front view only; (ii) back view only; (iii) both views in two or more files; or (iv) both views in a single merged file (block 708). After block 706 or block 708, method 700 includes capturing visual content data and generating image file(s) based on the set mode (block 710). Method 700 includes determining whether the screen capture mode is set to both front and back views in a single image file (decision block 712). In response to determining that the screen capture mode is set to both front and back views in a single image file, method 700 includes capturing position data of the flexible display (block 714). Method 700 includes associating the position data with the single image file for both views (e.g., as image metadata in exchangeable image file format (EXIF)) (block 716). Then method 700 ends. In response to determining that the screen capture mode is not set to both front and back views in a single image file, method 700 includes tagging the image file(s) with front/back information that is optional in EXIF (block 718). Then method 700 ends.

In one or more embodiments, a display roller rolls the remaining portion of the display to provide a back display on the back side of the first housing, while the flexible display support structure is in the retracted position. Method 700 may further include determining dimensions of the front display and the back display based on the position sensor. Method 700 may further include presenting visual content on the flexible display with the back display rotated 180 degrees to the front display so that the visual content appears right side up as viewed. In response to a trigger to screen record the visual content, method 700 may further include recording in one or more media files at least one frame of one or both of the front display and the back display along with position data of the flexible display support structure corresponding to the at least one frame.

In one or more particular embodiments, method 700 may further include, prior to recording the at least one frame, presenting on the display a series of selectable recording options for selectably recording one of a front display, a back display, a combined front and back display in a single image file, and both the front display and the back display in separate image files. Method 700 may further include monitoring for a selection input. Method 700 may further include completing a specific one of the recording options that is identified by the selection input. Method 700 may further include storing the recording option within image metadata of the recorded one or more media files.

In one or more particular embodiments, in response to identifying an indication that only one the front display and the back display is to be recorded, method 700 may further include recording in one media file at least one frame of the indicated one of the front display and the back display with the position data of the flexible display support structure corresponding to the at least one frame. In response to a later request for playback of the one media file, method 700 may further include activating the translation mechanism to match a position of the flexible display support structure with the position data corresponding to the at least one frame. Method 700 may further include presenting the at least one frame of the indicated one of the front display and the back display on the corresponding portion of the flexible display in a same display position as when the at least one frame was captured. Method 700 may further include presenting a notification on an opposite side of the flexible display to look at the corresponding portion of the flexible display in order to see the at least one frame.

In one or more particular embodiments, in response to determining that a control input is received indicating screen recording of only one of the front display and the back display, method 700 may further include recording in one media file the at least one frame of the only one of the front display and the back display, along with position data of the flexible display support structure corresponding to the at least one frame. In one or more specific embodiments, in response to detecting a change in a position of the display during a screen recording, method 700 may further include transitioning the recording option to record the entire display and capture per frame display position data within the image metadata. In an example, in the event that the electronic device changes display position while doing screen recording after a user select any one of the options, the device shall always record the whole display at a maximum physical size in one single file and capture per frame display position data. The display position data may be stored in per frame metadata section or an overlay file similar to video subtitle file.

In one or more embodiments, a front image capturing device is communicatively coupled to a controller of the electronic device and is positioned at a front side of one of the first housing and the flexible display support structure. A back image capturing device is communicatively coupled to the controller and is positioned at a back side of one of the first housing and the flexible display support structure. Method 700 may further include receiving a front image from the front image capturing device and a back image from the back image capturing device. Method 700 may further include performing image recognition of the front image and the back image to identify whether a user is viewing the front display or the back display. In response to determining that the user sequentially viewed both the front display and the back display during screen capture, method 700 may further include recording, in the one or more media files, more than one frame comprising displayed content of the front display and the back display along with position data of the flexible display support structure corresponding to the more than one frame. In response to determining that the user views only one of the front display and the back display during screen capture, method 700 may further include recording in the one or more media files the at least one frame including only content from a corresponding one of the front display and the back display along with position data of the flexible display support structure corresponding to the at least one frame.

In one or more embodiments, the flexible display support structure is a blade assembly having a blade slidably coupled to the first housing and having the flexible display attached to the blade. The blade has a rigid portion positionable between a retracted position aligned with the front side of the device housing and an extended position extending beyond a second housing edge opposite to the first housing edge of the first housing. The blade includes a flexible portion that contacts the display roller between the retracted position and the extended position to move a portion of the blade assembly between the front side and the back side. Method 700 may further include activating the translation mechanism to slide the blade assembly relative to the first housing between a fully retracted position and a fully extended position.

In one or more embodiments, the flexible display support structure is a telescoping housing having an extension portion slidingly received into a first housing edge of the first housing. Method 700 may further include activating the translation mechanism to position the telescoping housing relative to the first housing between a fully retracted position and a fully extended position.

With reference to FIG. 8A, in one or more embodiments, method 800 include monitoring screen captured image controls (block 802). Method 800 includes determining whether an input is received at the screen captured image controls to present a thumbnail gallery of screen captured images (decision block 804). In response to determining that an input is received at the screen captured image controls to present a thumbnail gallery of screen captured images, method 800 includes accessing thumbnail versions of screen captured images in memory of the electronic device (block 806). The screen captured images may have been captured by the electronic device or may have been received from a second electronic device. The screen captured images have an original resolution that supports presentation in a detail view at the original resolution. The thumbnail version is rendering of the screen captured images to a smaller size that results in a loss of detail. Method 800 includes presenting a thumbnail gallery of the screen captured images (block 808). Method 800 includes determining whether a user input is received for a selected thumbnail of the thumbnail gallery (decision block 810). In response to determining that a user input is not received for a selected thumbnail of the thumbnail gallery, method 800 returns to block 802. In response to determining that a user input is received for a selected thumbnail of the thumbnail gallery, method 800 includes evaluating image file(s) corresponding to the selected thumbnail for accompanying position data of an extendable display that originally presented the detail view (block 812). Method 800 includes determining whether display position is included in the image file(s) (decision block 814). In response to determining that the display position is included in the image file(s), method 800 includes activating translation mechanism to position the flexible display to the display position included in the image file(s) (decision block 816). Method 800 includes presenting the detail view of the image file(s) via an entirety of the flexible display, with the content aligned according to the display position (block 818). Then method 800 ends. In response to determining that the display position is not included in the image file(s), method 800 proceeds to block 820 of FIG. 8B.

With reference to FIG. 8B, method 800 includes evaluating the image file(s) for front and back display tags accompanying one or two detail views ("tagged display view(s)"). The flexible display is an elongate rectangle. When the screen capture occurs on the flexible display that is rolled back on the back side of the electronic device, the visual content presented on the back display is rotated 180 degrees in orientation to match orientation presentation of the front display. To recreate correct placement and orientation, each of the one or two detail views contained in the image file(s) may be tagged with either front display information or back display information. Method 800 includes determining which of the front display and the back display is being actively used currently as the "active display view" (block 822). In an example, one of the front and back displays is activated while the other one is inactivated. In another example, both front and back displays may be presenting visual content, but facial recognition is used to identify an authorized user facing one of the front and back displays. In an additional example, touch control inputs are being made to one of the front and back displays. Method 800 includes determining whether the image file(s) are tagged with front or back information (decision block 822). In response to determining that the image file(s) are tagged with front or back information, method 800 includes determining whether the tagged display view (i.e., the specific one of the front and back displays where the detail view was originally screen captured) is the active display view (i.e., the display is primarily being used by the user of the electronic device) (decision block 824). In response to determining that the tagged display view is not the active display view, method 800 includes presenting a pop up notice on active display view that detail view of image file(s) (i.e., the tagged display view) is being presented on the opposite display to the active display view (block 826). Method 800 includes activating a translation mechanism to position flexible display to support the detail view (block 828). Method 800 includes presenting the detail view of the image file(s) via an active display view (block 830). Then method 800 ends. In response to determining in decision block 822 that the image file(s) are not tagged with front or back information or in response to determining that the tagged display view is the active display view in decision block 824, method 800 proceeds to block 820.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
a first housing having a front side and a back side;
a flexible display support structure moveably attached to and positionable on the first housing to move a distal edge between a retracted position and an extended position relative to the first housing;
a flexible display coupled to the flexible display support structure across a front side of the first housing to present a larger portion of the flexible display as a front display on the front side, while the flexible display support structure is in the extended position, and a smaller portion of the flexible display as the front display on the front side with a remaining portion being one of: (i) scrolled up inside of the first housing; and (ii) rolled back providing a back display on the back side of the first housing, while the flexible display support structure is in the retracted position;
a translation mechanism operable to position the flexible display support structure between the retracted position and the extended position;
a position sensor configured to detect a position of the flexible display support structure relative to the first housing; and
a controller communicatively coupled to the flexible display, the translation mechanism, and the position sensor, and which:
determines dimensions of the front display based on the position sensor;
presents visual content on the flexible display; and
in response to a trigger to screen record the visual content:
captures, via the position sensor, position data corresponding to a current position of the flexible display support structure, which determines a current dimension of the front display that is extended on the front side of the first housing; and
records in one or more media files at least one frame of the front display along with the position data of the flexible display support structure within one of a header and metadata of the one or more media files, the position data indicating an extended state of the flexible display support structure between a fully stowed and a fully extended state that is to be used during playback of the one or more media files.

2. The electronic device of claim 1, wherein the controller:
in response to a playback trigger for the one or more media files:
activates the translation mechanism to match a position of the flexible display support structure with the position data corresponding to the at least one frame; and
presents the at least one frame on corresponding portions of the flexible display from which the at least one frame was captured.

3. The electronic device of claim 2, wherein:
the flexible display support structure comprises a blade assembly having a blade slidably coupled to the first housing and having the flexible display attached to the blade, the blade having a rigid portion positionable between a retracted position aligned with the front side of the device housing and an extended position extending beyond a second housing edge opposite to the first housing edge of the first housing, the blade comprising a flexible portion that contacts the display roller between the retracted position and the extended position to move a portion of the blade assembly between the front side and the back side; and
the controller activates the translation mechanism to slide the blade assembly relative to the first housing between the fully retracted position and the fully extended position.

4. The electronic device of claim 2, wherein:
the flexible display support structure comprises a telescoping housing having an extension portion slidingly received into a first housing edge of the first housing; and
the controller activates the translation mechanism to position the telescoping housing relative to the first housing between a fully retracted position and a fully extended position.

5. The electronic device of claim 1, further comprising a scrolling mechanism incorporated inside the first housing and that receives the remaining portion of the flexible display while the flexible display support structure is in the retracted position, and wherein:

the flexible display support structure comprises a telescoping housing having an extension portion slidingly received into a first housing edge of the first housing; and the controller:
   in response to determining that the trigger indicates a screen shot, records one frame with the position data; and
   in response to terminating capture of a screen recording having more than one frame with corresponding more than one position data:
      determines a largest size of the front display during capture of the more than one frame;
      resizes each frame corresponding to the front display being captured to the largest size frame by padding a frame extension portion comprising blank visual content; and
      records the more than one frame including the largest sized frame and each of the resized frames.

6. The electronic device of claim 1, further comprising a display roller that rolls the remaining portion to provide a back display on the back side of the first housing, while the flexible display support structure is in the retracted position, and wherein the controller:
   determines dimensions of the front display and the back display based on the position sensor;
   presents visual content on the flexible display with the back display rotated 180 degrees to the front display so that the visual content appears right side up as viewed; and
   in response to a trigger to screen record the visual content, records in one or more media files at least one frame of one or both of the front display and the back display along with position data of the flexible display support structure corresponding to the at least one frame.

7. The electronic device of claim 1, wherein prior to recording the at least one frame, the controller:
   presents on the display a series of selectable recording options for selectably recording one of a front display, a back display, a combined front and back display in a single image file, and both the front display and the back display in separate image files;
   monitors for a selection input;
   completes a specific one of the recording options that is identified by the selection input; and
   stores the recording option within image metadata of the recorded one or more media files.

8. The electronic device of claim 7, wherein the controller:
   in response to identifying an indication that only one of the front display and the back display is to be recorded, records in one media file at least one frame of the indicated one of the front display and the back display with the position data of the flexible display support structure corresponding to the at least one frame; and
   in response to a later request for playback of the one media file:
      activates the translation mechanism to match a position of the flexible display support structure with the position data corresponding to the at least one frame;
      presents the at least one frame of the indicated one of the front display and the back display on the corresponding portion of the flexible display in a same display position as when the at least one frame was captured; and
      presents a notification on an opposite side of the flexible display to look at the corresponding portion of the flexible display in order to see the at least one frame.

9. The electronic device of claim 7, wherein the controller:
   in response to determining that a control input is received indicating screen recording of only one of the front display and the back display, records in one media file the at least one frame of the only one of the front display and the back display, along with position data of the flexible display support structure corresponding to the at least one frame.

10. The electronic device of claim 1, wherein the controller:
   in response to detecting a change in a position of the display during a screen recording, transition the recording option to record the entire display and capture per frame display position data within the image metadata.

11. The electronic device of claim 1, further comprising:
   a front image capturing device communicatively coupled to the controller and positioned at a front side of one of the first housing and the flexible display support structure; and
   a back image capturing device communicatively coupled to the controller and positioned at a back side of one of the first housing and the flexible display support structure, and wherein the controller:
      receives a front image from the front image capturing device and a back image from the back image capturing device;
      performing image recognition of the front image and the back image to identify whether a user is viewing the front display or the back display;
      in response to determining that the user sequentially viewed both the front display and the back display during screen capture, records, in the one or more media files, more than one frame comprising displayed content of the front display and the back display along with position data of the flexible display support structure corresponding to the more than one frame; and
      in response to determining that the user views only one of the front display and the back display during screen capture, records in the one or more media files the at least one frame comprising content from a corresponding one of the front display and the back display along with position data of the flexible display support structure corresponding to the at least one frame.

12. A method comprising:
   operating a translation mechanism to position a distal edge of a flexible display support structure relative to a first housing of an electronic device between a retracted position and an extended position, the first housing having a front side and a back side, a flexible display coupled to the flexible display support structure across a front side of the first housing to present a larger portion of the flexible display as a front display on the front side, while the flexible display support structure is in the extended position, and a smaller portion of the flexible display as the front display on the front side with a remaining portion being one of: (i) scrolled up inside of the first housing; and (ii) rolled back providing a back display on the back side of the first housing, while the flexible display support structure is in the retracted position;

monitoring a position sensor configured to detect a position of the flexible display support structure relative to the first housing;
determining dimensions of the front display based on the position sensor;
presenting visual content on the flexible display; and
in response to a trigger to screen record the visual content;
capturing, via the position sensor, position data corresponding to a current position of the flexible display support structure, which determines a current dimension of the front display that is extended on the front side of the first housing; and
recording in one or more media files at least one frame of the front display along with the position data of the flexible display support structure within one of a header and metadata of the one or more media files, the position data indicating an extended state of the flexible display support structure between a fully stowed and a fully extended state that is to be used during playback of the one or more media files.

13. The method of claim 12, further comprising:
in response to a playback trigger for the one or more media files:
activating the translation mechanism to match a position of the flexible display support structure with the position data corresponding to the at least one frame; and
presenting the at least one frame on corresponding portions of the flexible display from which the at least one frame was captured.

14. The method of claim 12, wherein:
the electronic device comprises a scrolling mechanism that receives the remaining portion of the flexible display while the flexible display support structure is in the retracted position;
the flexible display support structure comprises a telescoping housing having an extension portion slidingly received into a first housing edge of the first housing and the method further comprises:
in response to determining that the trigger indicates a screen shot, recording one frame with the position data; and
in response to terminating capture of a screen recording having more than one frame with corresponding more than one position data:
determining a largest size of the front display during capture of the more than one frame;
resizing each frame corresponding to the front display being captured to the largest size frame by padding a frame extension portion comprising blank visual content; and
recording the more than one frame including the largest sized frame and each of the resized frames.

15. The method of claim 12, wherein the electronic device comprises a display roller that rolls the remaining portion to provide a back display on the back side of the first housing, while the flexible display support structure is in the retracted position, and wherein the method further comprises:
determining dimensions of the front display and the back display based on the position sensor;
presenting visual content on the flexible display with the back display rotated 180 degrees to the front display so that the visual content appears right side up as viewed; and
in response to a trigger to screen record the visual content, recording in one or more media files at least one frame of one or both of the front display and the back display along with position data of the flexible display support structure corresponding to the at least one frame.

16. The method of claim 12, further comprising:
prior to recording the at least one frame:
presenting on the display a series of selectable recording options for selectably recording one of a front display, a back display, a combined front and back display in a single image file, and both the front display and the back display in separate image files;
monitoring for a selection input;
completes a specific one of the recording options that is identified by the selection input; and
storing the recording option within image metadata of the recorded one or more media files.

17. The method of claim 16, further comprising:
in response to identifying an indication that only one of the front display and the back display is to be recorded, recording in one media file at least one frame of the indicated one of the front display and the back display with the position data of the flexible display support structure corresponding to the at least one frame; and
in response to a later request for playback of the one media file:
activating the translation mechanism to match a position of the flexible display support structure with the position data corresponding to the at least one frame;
presenting the at least one frame of the indicated one of the front display and the back display on the corresponding portion of the flexible display in a same display position as when the at least one frame was captured; and
presenting a notification on an opposite side of the flexible display to look at the corresponding portion of the flexible display in order to see the at least one frame.

18. The method of claim 16, further comprising:
in response to determining that a control input is received indicating screen recording of only one of the front display and the back display, recording in one media file the at least one frame of the only one of front display and the back display, along with position data of the flexible display support structure corresponding to the at least one frame.

19. The method of claim 12, further comprising:
in response to detecting a change in a position of the display during a screen recording, transitioning the recording option to record the entire display and capture per frame display position data within the image metadata.

20. A non-transitory computer program product comprising:
a computer readable storage device; and
program code on the computer readable storage device that when executed by a processor associated with an electronic device, the program code enables the electronic device to provide functionality of:
operating a translation mechanism to position a distal edge of a flexible display support structure relative to a first housing of an electronic device between a retracted position and an extended position, the first housing having a front side and a back side, a flexible display coupled to the flexible display support structure across a front side of the first housing to present a larger portion of the flexible display as a front display on the front side, while the flexible display support structure is in the extended position, and a smaller portion of the flexible display as the front display on the front side with a remaining portion being one of: (i) scrolled up inside of the first housing; and (ii) rolled back providing a back display on the back side of the first housing, while the flexible display support structure is in the retracted position;

monitoring a position sensor configured to detect a position of the flexible display support structure relative to the first housing;

determining dimensions of the front display based on the position sensor;

presenting visual content on the flexible display; and in response to a trigger to screen record the visual content:
- capturing, via the position sensor, position data corresponding to a current position of the flexible display support structure, which determines a current dimension of the front display that is extended on the front side of the first housing; and
- recording in one or more media files at least one frame of the front display along with the position data of the flexible display support structure within one of a header and metadata of the one or more media files, the position data indicating an extended state of the flexible display support structure between a fully stowed and a fully extended state that is to be used during playback of the one or more media files.

* * * * *